United States Patent [19]

Hayashi

[11] Patent Number: 4,739,472
[45] Date of Patent: Apr. 19, 1988

[54] INFORMATION PROCESSING DEVICE CAPABLE OF RAPIDLY PROCESSING INSTRUCTIONS OF DIFFERENT GROUPS

[75] Inventor: Hideo Hayashi, Tokyo, Japan

[73] Assignee: NEC Corporation, Tokyo, Japan

[21] Appl. No.: 805,794

[22] Filed: Dec. 6, 1985

[30] Foreign Application Priority Data

Dec. 7, 1984 [JP] Japan .................................. 59-258973

[51] Int. Cl.⁴ ............................................. G06F 9/30
[52] U.S. Cl. .................................................... 364/200
[58] Field of Search ... 364/200 MS File, 900 MS File

[56] References Cited

U.S. PATENT DOCUMENTS

4,128,880 12/1978 Cray, Jr. ............................. 364/200

Primary Examiner—Thomas M. Heckler
Attorney, Agent, or Firm—Schwartz, Jeffery, Schwaab, Mack, Blumenthal & Evans

[57] ABSTRACT

In an information processing device comprising an instruction decoder, an instruction processing unit, and a memory unit, the instruction decoder classifies a sequence of instructions into a first group for the instruction processing unit and a second group for making the memory unit cooperate with the instruction processing unit. The instructions of the first group are temporarily retained in an instruction stack register before delivery to the instruction processing unit while the instructions of the second group is directly delivered to the memory unit. A state indication unit produces a plurality of flags representative of internal states of the instruction processing unit. A monitoring unit monitors the instructions, the retained first-group instruction, and the flags to enable the instruction processing unit, the memory unit, and the instruction stack register and to change the flags. The memory unit can consecutively be accessed for loading the instruction processing unit with data signals or for storage of data signals into the instruction processing unit so as to make the same continuously run without superfluous interruption because the instructions of the second group are executed prior to execution of the first group.

3 Claims, 2 Drawing Sheets

INFORMATION PROCESSING DEVICE CAPABLE OF RAPIDLY PROCESSING INSTRUCTIONS OF DIFFERENT GROUPS

BACKGROUND OF THE INVENTION

This invention relates to an information processing device for use in carrying out vector calculation.

In U.S. Pat. No. 4,128,880 issued to R. Cray, Jr, a vector processing computer is disclosed which comprises a memory section, a plurality of vector registers coupled to the memory section, and a plurality of independent segmented functional units, such as adders and multipliers, operable in cooperation with the vector registers. A bulk of data signals are transferred from the memory section to the vector registers and are successively transferred in vector processing from one or more vector registers to one of the functional units to be processed and to be returned back to another one of the vector registers. Such vector processing is progressive in a chaining mode of operation under control of an instruction decoder or instruction interpreting unit coupled to a central processing unit and is therefore carried out at a high speed. For brevity of description, a combination of the vector registers and the functional units will be referred to as an instruction processing unit in the instant specification.

More specifically, a load instruction and a store instruction are delivered from the central processing unit to the instruction decoder on loading the vector registers with the data signals stored in the memory unit and on storing results of vector processing in the memory unit, respectively. In this event, the instruction decoder sends a memory enable signal or memory indication signal to the memory unit.

An arithmetic or operation instruction is also delivered from the central processing unit to the instruction decoder. Responsive to the operation instruction, the instruction decoder sends a unit enable signal or unit indication signal to the instruction processing unit. The instruction processing unit carries out arithmetic operation in accordance with the unit indication signal and the operation instruction. For convenience of description, the unit indication signal and the memory indication signal will be called first and second indication signals, respectively.

Let each load instruction be repeatedly issued from the central processing unit with the arithmetic instruction interposed between two adjacent ones of the repeated load instructions. In this case, processing is successively carried out in the order of a first one of the load instructions, the arithmetic instruction, and a second one of the load instructions. It is to be noted here that each load instruction is considerably time-consuming to be processed in comparison with the operation instruction because the memory unit should be accessed thereby. Usually, each of the load instructions is successively processed one after another. As a result, the second indication signal for the second load instruction must be produced after completion of a loading operation for the first load instruction. Accordingly, a long duration should be wasted between the second indication signals for two adjacent ones of the load instructions. This applies to the store instruction. From this fact, it is readily understood that the arithmetic calculation can not be carried out at a high speed when the memory unit is frequently accessed by the instruction decoder.

SUMMARY OF THE INVENTION

It is an object of this invention to provide an information processing device which can carry out an arithmetic calculation at a high speed even when a memory unit is frequently accessed.

It is another object of this invention to provide an information processing device of the type described which can shorten a duration interposed between two adjacent ones of load or store instructions.

It is a further object of this invention to provide an information processing device which is suitable for vector processing.

An information processing device to which this invention is applicable is operable in response to a sequence of instructions and comprises an instruction interpretting unit for interpretting the instructions to produce a first and a second indication signal when the instructions belong to a first and a second group, respectively, an instruction processing unit coupled to the instruction interpretting unit for processing the instructions of the first group in response to the first indication signal, and cooperating means coupled to the instruction interpretting unit and the instruction processing unit for cooperating with the instruction processing unit in compliance with the instruction of the second group in response to the second indication signal. According to this invention, the instruction interpretting means comprises state indicating means for producing a plurality of state indicating signals in parallel. The state indicating signals are indicative of internal states of the instruction processing unit. The instruction interpretting means compries stack register means responsive to an enable signal for temporarily retaining the instructions of the first group to produce the instructions retained therein as a retained first-group instruction one at a time and local processing means responsive to the instruction of the first and the second groups and coupled to the stack register means, the state indication means, the instruction processing unit, and said cooperating means. The local processing means is for processing the instructions of the first and the second groups with reference to the state indicating signals and the retained first-group instruction to deliver the first and second indication signals to the instruction processing unit and the cooperating means, respectively, and to deliver the enable signal to the state indicating means when the instruction being processed belongs to the first group.

DESCRIPTION OF THE PREFERRED EMBODIMENTS

Figure 1:
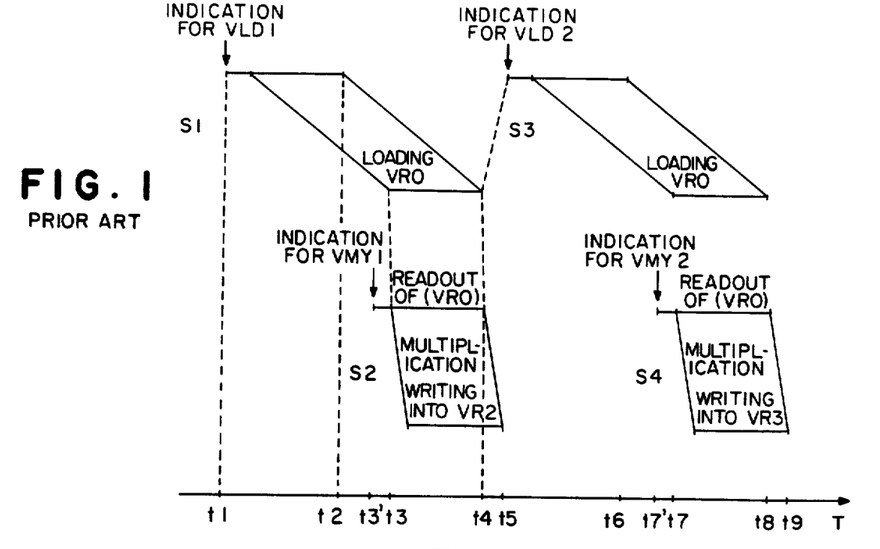
FIG. 1 is a time chart for use in describing operation of a conventional information processing device.

Referring to FIG. 1, conventional vector processing will be described for a better understanding of this invention and is carried out in a conventional information processing device which comprises an instruction interpretting unit or instruction decoder for successively decoding or interpretting each of instructions to produce a first and a second indication signal, an instruction processing unit enabled by the first indication signal so as to process each instruction given from the instruction decoder, and a memory unit enabled by the second indication signal so as to carry out write-in and read-out operations. From this fact, it is readily understood that the first indication signal is delivered from the instruction decoder to the instruction processing unit when each instruction is an operation instruction for calculating an arithmetic calculation. On the other hand, the second indication signal is delivered from the instruction decoder to the memory unit when each instruction is a load or a store instruction for accessing the memory unit to move data signals between the memory unit and the instruction processing unit.

The instruction processing unit comprises a plurality of vector registers and arithmetic elements, such as multipliers and adders. The vector registers are loaded with the data signals from the memory unit when the load instruction is decoded by the instruction decoder. The vector registers store result data signals resulting from the processing. Arithmetic calculations are carried out by the arithmetic elements when the arithmetic instructions are decoded by the instruction decoder.

Let the instructions be supplied to the instruction decoder in the order exemplified in Table 1 and executed in the information processing unit.

TABLE 1

| Steps | Operation | Remarks |
|---|---|---|
| S1 | VLD1 VR0 | Vector Load |
| S2 | VMY1 VR2 ← VR0 × A | Vector Multiplication |
| S3 | VLD2 VR0 | Vector Load |
| S4 | VMY2 VR3 ← VR0 × B | Vector Multiplication |

In Table 1, it is assumed that zeroth through third of the vector registers VR0 to VR3 are included in the instruction processing unit and that VLD1 and VLD2 and VMY1 and VMY2 are indicative of vector load and vector multiplication, respectively, and may be the vector load instructions and multiplication instructions, respectively. The multiplication instructions are one of the operation instructions. At a first step S1, a first one of the vector load instructions VLD1 indicates to load the zeroth vector register VR0 with first vector data signals. At a second step S2, a first scalar data signal A is multiplied by contents of the zeroth vector register VR0 in accordance with a first one VMY1 of the multiplication instructions to produce a first product of the first scalar data signal and the contents of the zeroth vector register VR0. The first product is thereafter moved to the second register VR2. Subsequently, the zeroth vector register VR0 is loaded with second vector data signals in accordance with a second one VLD2 of the vector load instructions at the third step S3. Vector multiplication is carried out between a second scalar data signal B and contents of the zeroth vector register VR0 in accordance with a second one of the multiplication instructions to calculate a second product therebetween. The second product is moved to the third vector register VR3 at a fourth step S4.

The first through fourth steps S1 to S4 will be processed in the conventional information processing device in a manner described in conjunction with FIG. 1. The first step S1 begins at a first time instant t1 at which the second indication signal for the first vector load instruction VLD1 is sent from the instruction decoder to the memory unit and is kept until a second time instant t2 in the memory unit. Thus, the first vector load instruction VLD1 lasts a duration between the first and second time instants t1 and t2. The duration is determined in consideration of an overhead time and an access time for accessing the memory unit.

After the first duration lapses, the zeroth vector register VR0 begins to be loaded with the first vector data signals at a third time instant t3. It is to be noted here that execution of the first multiplication instruction VMY1 may be started if the first vector data signals begin to be stored in the zeroth vector register VR0. Under the circumstances, the first indication signal for the first multiplication instruction VMY1 is produced before the first vector data signals are stored in the zeroth vector register VR0. Therefore, the first indication signal for the first multiplication instruction VMY1 is issued at an intermediate time instant t3' between the second and third time instants t2 and t3.

The first vector data signals may be successively read out of the zeroth vector register VR0 immediately after each vector data signal is stored therein. Hence, multiplication can be instantly carried out between each of the first vector data signals and the first scalar data signal to calculate the first products after each of the first vector data signals is stored in the zeroth vector register VR0. The first products are successively written into the second vector register VR2 at once. Similar operation is carried for all of the first vector data signals.

When the zeroth vector register VR0 is loaded with the last one of the first vector data signals at a fourth time instant t4, the multiplication and write-in operation related to the last one of the first vector data signals are finished at once, as shown in FIG. 1. Thus, the first step S1 is completed at the fourth time instant t4 while the second step S2 is completed at an additional time instant at which the first products are completely written into the second vector register VR2. The first step S1 is carried out between the first time instant t1 and a fourth time instant t4 while the second step S2 is carried out between the intermediate time instant t3' and the additional time instant.

The second indication signal for the second vector load instruction VLD2 is produced at the fifth time instant t5 after the last one of the first vector data signals is stored in the zeroth vector register VR0. In other words, the second indication signal for the second vector load instruction VLD2 can not be produced until the zeroth vector register VR0 is completely loaded with the first vector data signals.

The third step S3 begins at the fifth time instant t5 to process the second vector load instruction VLD2. As a result, the second vector data signals are stored in the zeroth vector register VR0 for a time interval between seventh and eighth time instants and t8. Thus, the third step S3 is carried out between the fifth and the eighth time instants t5 and t8.

The first indication signal for the second multiplication instruction VMY2 is issued at a subsidiary time instant t7' prior to the seventh time instant t7. As soon as the second vector data signals are stored in the zeroth vector register VR0 at the seventh time instant t7, they are read out of the zeroth vector register VR0 and multiplied by the second scalar data signal B to calculate the second products. The second products are stored or written into the third vector register VR3. When all of the second vector data signals are stored in the zeroth vector register VR0 at the eighth time instant t8, storage of the second products into the third vector register VR3 is finished at a ninth time instant t9 appearing immediately after the eighth time instant t8. The fourth step S4 is thus carried out between the subsidiary time instant t7' and the ninth time instant t9.

As readily understood from FIG. 1, the second and fourth steps S2 and S4 mostly overlap with the first and third steps S1 and S3, respectively, and are rapidly processed in comparison with the first and third steps S1 and S3. However, the second and fourth steps S2 and S4 do not overlap on each other because the third step S3 is started after completion of the first step S1, in spite of the fact that the second and fourth steps S2 and S4 per se can be rapidly processed. This means that the arithmetic elements, such as multipliers, included in the instruction processing unit are intermittently enabled to carry out multiplication at a comparatively long time interval and are not effectively utilized in the conventional information processing device.

Figure 2:
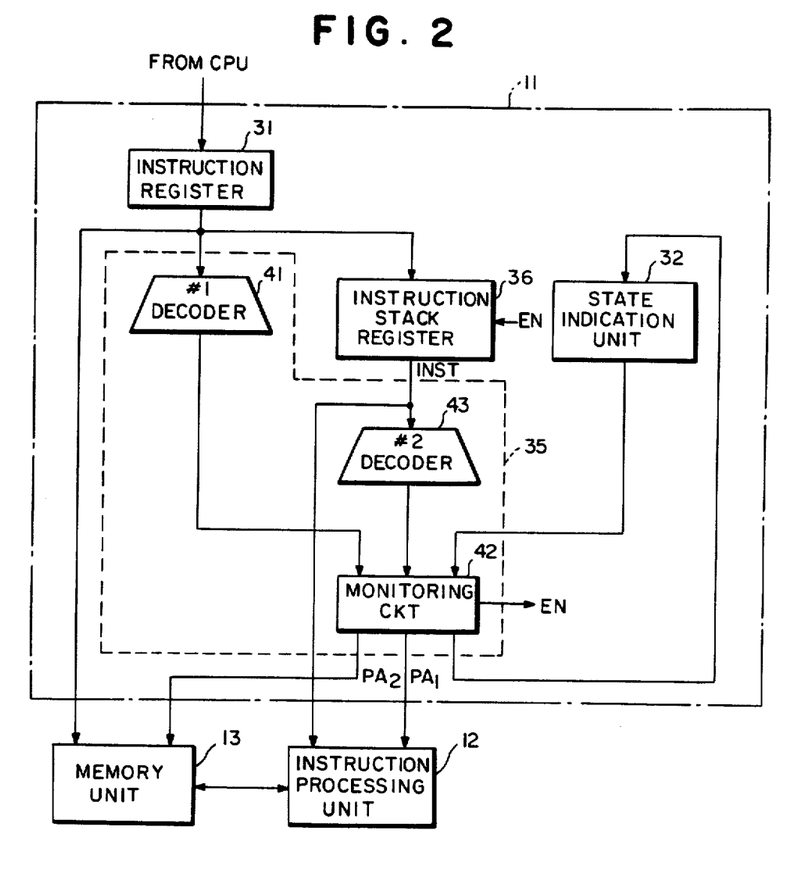
FIG. 2 is a block diagram of an information processing device according to a preferred embodiment of this invention.
Figures 3, 4, 5:
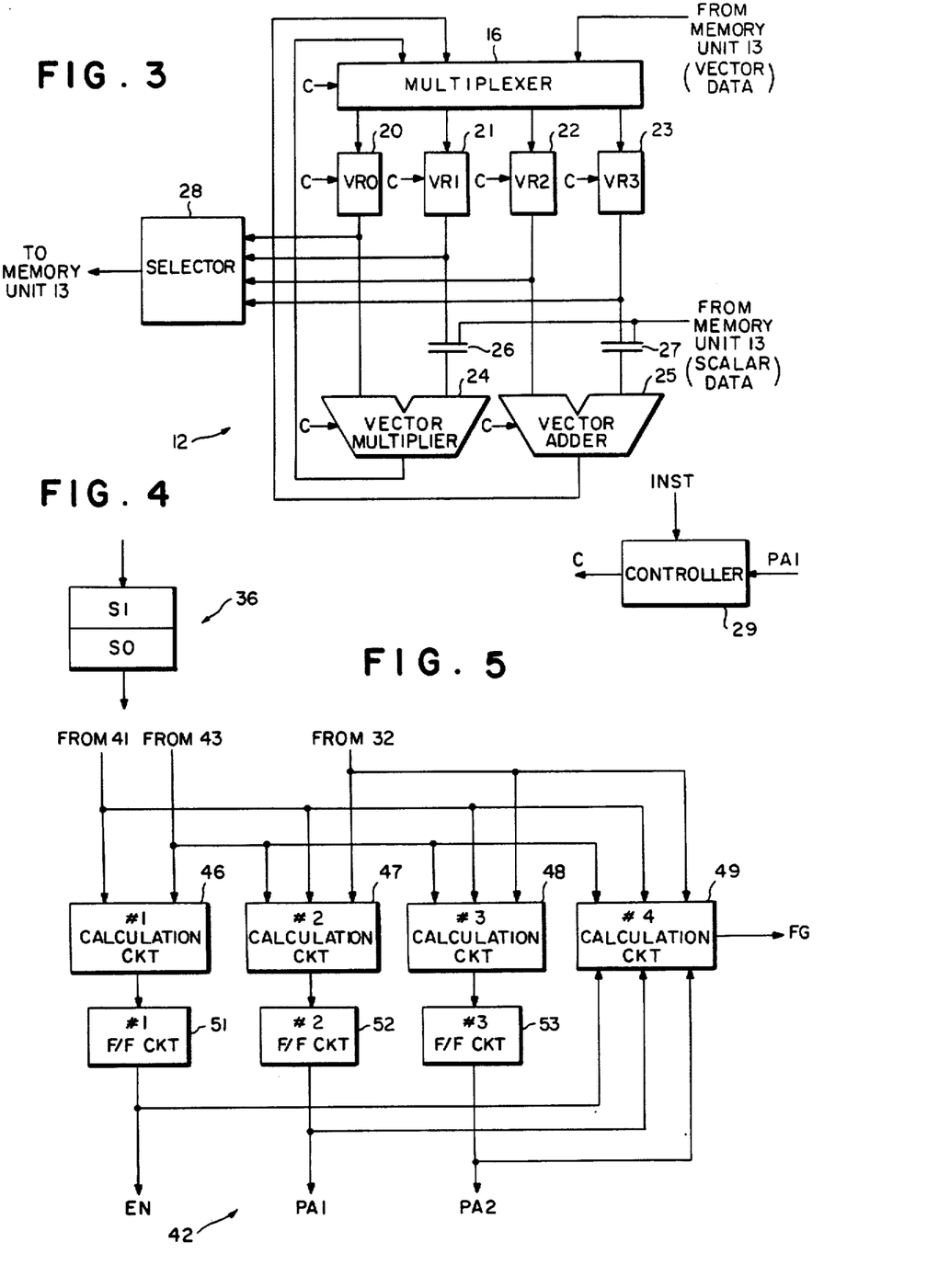
FIG. 3 is a block diagram of an instruction processing unit for use in the information processing device illustrated in FIG. 2.
FIG. 4 is a block diagram of an instruction stack register for use in the information processing device illustrated in FIG. 2.
FIG. 5 is a block diagram of a part of an instruction decoder for use in the information processing device illustrated in FIG. 2.

Referring to FIGS. 2 and 3, an information processing device according to a preferred embodiment of this invention is for use in combination with a central processing unit (not shown) which delivers a sequence of instructions to the illustrated processing device. For brevity of description, it will be assumed that the instruction sequence carries out vector processing as described in conjunction with Table 1.

The illustrated information processing device comprises an instruction decoder or instruction interpretting unit 11 operable in a manner to be described later, an instruction processing unit 12, and a utilizing means to utilize the results of the instruction processing unit 12, such as a memory unit 13. For the time being, it may be understood that the instruction decoder 11 delivers first and second indication signals to the instruction processing unit 12 and the memory unit 13, respectively. The first and second indication signals may be called first and second parameter signals PA1 and PA2 for enabling the instruction processing unit 12 and the memory unit 13, respectively. As shown in FIG. 3, the illustrated instruction processing unit 12 comprises a multiplexer 16, zeroth through third vector registers VR0 to VR3 20 to 23, a vector multiplier 24, a vector adder 25, and first and second switches 26 and 27. The multiplexer 16 is supplied with the vector data signals from the memory unit 13 (FIG. 2) while the first and second switches 26 and 27 are supplied with the scalar data signals from the memory unit 13 through scalar registers (not shown). Although not depicted, the instruction processing unit 12 may additionally comprise a shifter, any other calculation circuits, and vector registers related to the shifter and the calculation circuits. Each vector register comprises a plurality of register elements and is assumed to substantially simultaneously carry out both of write-in and readout operations because the readout operation becomes possible for each register element as soon as the write-in operation is carried out for the corresponding register element.

In FIG. 3, the vector multiplier 24 is connected directly to the zeroth vector register 20 and to the first vector register 21 through the first switch 26. Thus, the vector multiplier 24 calculates either products of the vector data signals read out of the zeroth and first vector registers 20 and 21 or products of the vector data signals read out of the zeroth vector register 20 and the scalar data signals given from the memory unit 13. Vector addition is carried out between the vector data signals read out of the second and third vector registers 22 and 23 and between the vector data signals read out of the second vector register 22 and the scalar data signals given from the memory unit 13. As a result, sums of the vector data signals or the vector and the scalar data signals are produced from the vector adder 25.

Each of the products and sums is fed back to one of the zeroth through third vector registers 20 to 23 through the multiplexer 16. The zeroth through third vector registers 20 to 23 are coupled to a selector 28 connected to the memory unit 13. Accordingly, each of the products and sums is sent to the memory unit 13 through the selector 28.

A controller 29 is enabled by the first indication signal, namely, first parameter signal PA1 and delivers control signals (collectively shown at c) to the above-mentioned elements, such as the multiplexer 16, the vector registers 20 to 23, the vector multiplier 24, the vector adder 25, and the selector 28 in accordance with the instructions which will presently become clear. It is to be kept in mind that a single one of the vector registers 20 to 23 is put into a register write-in mode by the control signals and that two of the vector registers 20 to 23 are simultaneously put into a register readout mode.

Referring back to FIG. 2, the instruction decoder 11 comprises an instruction register 31 loaded with each of the instructions one by one from the central processing unit. It is to be noted here that the instructions are divisible into first and second groups which are related to the instruction processing unit 12 and the memory unit 13, respectively.

More specifically, the instructions of the first group comprises operation instructions indicative of an arithmetic calculation carried out in the instruction processing unit 12. Each operation instruction makes the instruction processing unit 12 carry out the arithmetic calculation by accessing at least one of the zeroth through third vector registers 20 to 23 and is depicted at INST in FIG. 3. In this event, each vector register 20 to 23 is selectively put into the register write-in mode and the register readout mode. As mentioned before, one of the vector registers 20 to 23 is indicated in the register write-in mode while two of the vector registers 20 to 23 are indicated in the register readout mode.

On the other hand, the instructions of the second group are for accessing the memory unit 13 either to load a specific one of the zeroth through third vector registers 20 to 23 with vector data signals stored in the memory unit 13 or to store results of the arithmetic calculation in the memory unit 13. Accordingly, the instructions of the second group comprises load instructions and store instructions for the vector registers 20 to 23 illustrated in FIG. 3. In the example being illustrated, a preceding and a following one of the load instructions for the same vector register may successively be issued before the stored vector data signals for the preceding load instruction are stored in the vector register in question, as will become clear later.

Each of the load and the store instructions is delivered to the memory unit 13 after the second indication or parameter signal PA2 is sent to the memory unit 13. Consequently, the memory unit 13 is selectively put into a write-in and a readout mode of operation which will be named memory write-in and memory readout modes, respectively.

In FIG. 2, the instruction decoder 11 comprises a state indication unit 32 for indicating internal states of the instruction processing unit 12 so as to avoid conflict or collision of the instructions. The state indication unit 12 comprises a plurality of flip flops which are for storing the internal states in the form of flags, respectively. The flags may be called state indicating signals.

More specifically, each of the vector registers 20 to 23 and the memory unit 13 is accessed into an accessed state by the first and second parameter signals PA1 and PA2 and thereafter becomes in a busy state. The accessed and busy states may be understood as the internal states. The accessed state may be considered a state of waiting for the busy state and will be called a waiting state.

As regards the vector registers 20 to 23, the busy state is divided into a write busy state and a read busy state which are represented by write and read busy flags, respectively. The write busy flags are made to correspond to the zeroth through third vector registers 20 to 23, respectively, and are specified by WBSYi, where i takes either one of zero to three. On the other hand, two of the read busy flags are made to correspond to each pair of the vector registers 20 and 21; 22 and 23 and represented by RBSY0 for the vector registers 20 and 21 and RBSY2 for the vector registers 22 and 23.

In addition, the waiting state is divided into a write wait state and a read wait state which correspond to the write and read busy states, respectively, and which are represented by WW and RW. Four write wait flags WW are provided corresponding to the zeroth through third vector registers 20 to 23 and specified by i. Two of the read wait flags RW0 and RW2 are made to correspond to the vector register pairs 20 and 21; 22 and 23, respectively.

As regards the memory unit 13, load wait flags LDWi are given to specify those load wait states of the zeroth through third vector registers 20 to 23 which are related to the vector load instructions and which wait for loading the vector registers with vector data signals stored in the memory unit 13. Load busy flags LDBSYi are also given to represent load busy states when the vector registers 20 to 23 are busy in cooperation with the memory unit 13.

Inasmuch as two of the vector load instructions can be supplied to the memory unit 13 with the same vector register indicated by the two vector load instructions, as mentioned before, this state should be indicated as the internal states. For this purpose, auxiliary load busy flags LDBSYiA are prepared in the illustrated device.

In any event, the load wait flags LDWi, the load busy flags LDBSYi, and the auxiliary load busy flags LDBSYiA are representative of states of the zeroth through third vector registers 20 to 23.

Zeroth and first additional flags V0 and V1 are also used in the instruction decoder 11, as will be described later.

The above-mentioned flags will be set or reset under control of a local processing unit 35 (FIG. 2), as will become clear as the description proceeds. Responsive to the instruction kept in the instruction register 31, the local processing unit 35 serves to deliver the first and second parameter signals PA1 and PA2 to the instruction processing unit 12 and the memory unit 13, respectively, and to deliver the received instruction to an instruction stack register 36 when the received instruction belongs to the first group and is therefore to be sent to the instruction processing unit 12. Operation of the instruction stack register 36 will be described later.

The received instruction is also delivered to a first decoder 41 of the local processing unit 35. Supplied with the received instruction, the first decoder 41 detects whether or not the received instruction is of the first group. The first decoder 41 supplies a monitoring circuit 42 with first and second decoded signals representative of reception of the first and second groups, respectively.

The first decoded signal may be either a read request signal or a write request signal. The read request signal indicates a pair of the vector registers 20 and 21 or 22 and 23 to be simultaneously accessed. The write request signal indicates one of the vector registers VRi for storing a result of calculation.

The second decoded signal may be a load request signal which is indicative of one of the vector registers VRi that is to be loaded with vector data signals read out of the memory unit 13.

The monitoring circuit 42 sends an enable signal EN and the first parameter signal PA1 to the instruction stack register 36 and the instruction processing unit 12 in response to the first decoded signal in a manner to be described, respectively. Responsive to the enable signal EN, the instruction stack register 36 is enabled to store the received instruction kept in the instruction register 31.

When the second decoded signal is decoded by the first decoder 41, the monitoring circuit 42 supplies the memory unit 13 with the second parameter signal PA2 in a manner to be described also. As a result, the received instructions of the second group are fed to the memory unit 13 without passing through the instruction stack register 36. This means that the instructions of the first group are delayed by the instruction stack register 36 relative to the instructions of the second group.

Let the enable signal EN be delivered to the instruction stack register 36 as a result of production of the first decoded signal.

Temporarily referring to FIG. 4, the instruction stack register 36 has zeroth and first entries S0 and S1 and places each operation instruction in a first-in-first-out order. The operation instruction is at first retained in the first entry S1 in synchronism with a clock pulse on condition that the first entry S1 is empty. The retained operation instruction is shifted to the zeroth entry in sychronism with the following clock pulse and is fed to the local processing unit 35, provided that the zeroth entry S0 is empty.

The zeroth and first additional flags V0 and V1 are set when the zeroth and first entries S0 and S1 are loaded with any operation instructions, respectively. Each of the zeroth and first additional flags V0 and V1 is representative of whether the corresponding entry is valid or not.

The operation instruction in the zeroth entry S0 of the instruction stack register 36 is fed to the instruction processing unit 12 and to a second decoder 43 as a retained instruction as depicted at INST in FIG. 3. The retained instruction in the zeroth entry S0 is decoded by the second decoder 43 into a read register pair signal when the retained instruction is a read instruction for either one pair of the vector registers 20 and 21 or the other pair. The read register pair signal is therefore indicative of either the one pair or the other pair. When the retained instruction is a write instruction, the second decoder 43 produces a write register signal indicative of one of the vector registers 20 to 23 for storing a calculation result.

Referring to FIG. 5 together with FIG. 2, the monitoring circuit 42 is formed by a logic circuit and comprises first through fourth calculation circuits 46, 47, 48, and 49 and first through third flip flop (F/F) circuits 51, 52, and 53 connected to the instruction stack register 36, the instruction processing unit 12, and the memory unit 13, respectively. The first calculation circuit 46 is connected to the first and second decoders 41 and 43 and sets the first flip flop circuit 51 for a predetermined or unit duration determined by a clock pulse (not shown) when a first predetermined condition holds. The first predetermined condition holds, if the received instruction in the instruction register 31 is the operation instruction and no conflict occurs between the vector registers indicated by the received instruction and by the retained instruction kept in the zeroth entry S0 with the first entry S1 left empty. From this fact, it is seen that the first flip flop circuit 51 is set when the first entry S1 is empty and the vector register or registers indicated by the received instruction are incoincident with those indicated by the retained instruction in the zeroth entry S0. Thus, the instruction stack register 36 is not loaded with any instruction which uses the same vector register or registers as the retained instruction stored in the zeroth entry S0.

The second calculation circuit 47 is connected to the first and second decoders 41 and 43 and to the state indicator unit 32. The second calculation circuit 47 sets the second flip flop circuit 52 for the unit duration when a second predetermined condition is satisfied. As a result, the first indication or parameter signal PA1 is delivered from the second calculation circuit 47 to the instruction processing unit 12 when the second flip flop circuit 52 is set.

The second predetermined condition holds when vector register or registers to be accessed by the retained instruction are not yet accessed by a preceding one of the instructions. Specificaly, when the retained instruction indicates readout of a pair of the vector registers, the first parameter signal PA1 is produced if the vector register pair in question are not being read by any other instructions and if no preceding load instruction is absent for the vector register pair or if a preceding load instruction is present and vector data signals for the preceding load instruction begin to be stored in the vector register pair. The states of the vector registers can be detected by monitoring the flags stored in the state indication unit 32. Absence or presence of the preceding load instruction can be detected by monitoring the load wait flags LDWi, the load busy flags LDBSYi, and the zeroth and first addition flags V0 and V1 stored in the state indication unit 32.

The third calculation circuit 48 is connected to the first and second decoders 41 and 43 and to the state indication unit 32 and delivers the second parameter signal PA2 to the memory unit 13 by setting the third flip flop circuit 53 when a third predetermined condition holds. As mentioned before, the second parameter signal PA2 indicates that the received instruction stored in the instruction register 31 is the load instruction to be delivered to the memory unit 13. The second parameter signal PA2 appears on condition that a destination vector register for load is not being put into a write-in state, that two load instructions are already delivered to the memory unit 13 and are not moot, and that the instruction stack register 36 is loaded with no operation instruction for reading the destination vector register indicated by the load instruction or an operation instruction reads vector data signals out of the destination vector register indicated by the preceding load instruction to be stored in the zeroth entry S0 and waits for starting storage of the vector data signals into the one of the vector register.

The fourth calculation circuit 49 is for setting the respective flags. The fourth calculation circuit 49 is connected to the first and the second decoders 41 and 43 and is operable in response to the enable signal EN and the first and second parameter signals PA1 and PA2.

Figure 6:
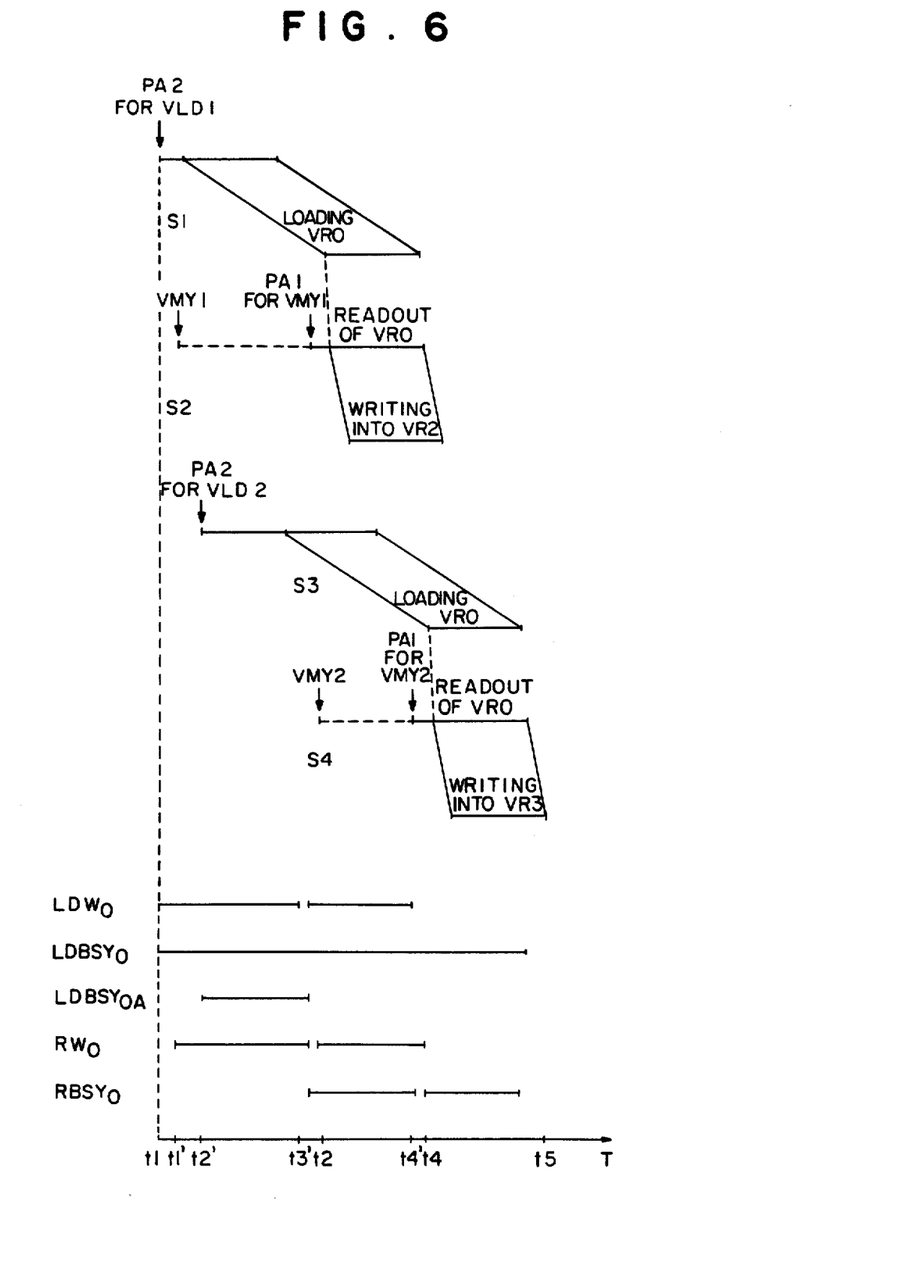
FIG. 6 is a time chart for use in describing operation of the information processing device illustrated in FIG. 2.

Referring to FIG. 6 together with FIGS. 2 and 5, it will be assumed that vector processing is carried out in the order exemplified in Table 1. For brevity of description, let all of the flags be kept at logic "0" levels, respectively. Under the circumstances, the first vector load instruction VLD1 is stored in the instruction register 31 and is interpretted by the first decoder 41. As a result, the second parameter signal PA2 is delivered from the third calculation circuit 48 through the third flip flop circuit 53 to the memory unit 13 at a first time instant t1. The first vector load instruction VLD1 is sent from the instruction register 31 to the memory unit 13 to be kept in the memory unit 13 as soon as it is interpretted by the first decoder 41.

As shown in Table 1, the first vector load instruction VLD1 indicates the zeroth vector register (VR0) 20 which is loaded with the first vector data signals from the memory unit 13. Therefore, the load wait flag LDW0 and the load busy flag LDBSY0 for the zeroth vector register 20 are set at the first time instant t1, as illustrated in a lower portion of FIG. 6. The load wait and busy flags LDW0 and LDBSY0 are produced by the fourth calculation circuit 49 and sent to the state indication unit 32 as flag signals FG (FIGS. 2 and 5). The load wait flag LDW0 is indicative of the state that the zeroth vector register 20 is waiting for loading.

It is to be noted in FIG. 6 that the first multiplication instruction VMY1 is stored at a first additional time instant t1' appearing immediately after the first time instant t1. At the additional time instant t1', the first vector load instruction VLD1 is already moved to the memory unit 13. Thus, the first multiplication instruction VMY1 is delivered to the instruction stack register 36 and is kept therein, as shown at a broken line. The second step S2 is therefore started at the first additional time instant t1' before the vector data signals are moved to the zeroth vector register 20. Let the first multiplication instruction VMY1 indicate to calculate a product of the first vector data signals stored in the vector registers 20 and 21 and to store the product in the second vector register 22 (FIG. 3). In this event, the read wait flag RW0 for the register pair 20 and 21 and the write wait flag WW2 for the second vector register 22 are put into the logic "1" levels by the fourth calculation circuit 49, respectively. Thereafter, the following operation instructions, such as the second multiplication instruction, can not access the zeroth through second vector registers 20 to 22 until the flags RW0 and WW2 are reset.

When the first multiplication instruction VMY1 is stored in the instruction stack register 36, the second vector load instruction VLD2 is kept in the instruction register 31 and decoded by the first decoder 41. In the example being illustrated, the second parameter signal PA2 is delivered from the third calculation circuit 48 to the memory unit 13 through the third flip flop 53 on condition that the preceding instruction, namely, VMY1 is not executed only by reason of waiting for the vector data signals and is a readout instruction for successively reading the vector data signals out of the zeroth vector register 20. In other words, the load wait flag LDW0 and the load busy flag LDBSY0 are neglected on delivery of the second parameter signal PA2 to the memory unit 13 in consideration of a preceding instruction. It is possible to monitor the preceding instruction by supervising the flags kept in the state indication unit 32.

The second parameter signal PA2 is produced at a second additional time instant t2' appearing immediately after the first additional time instant t1'.

Simultaneously with delivery of the second parameter signal PA2, the auxiliary load busy flag LDBSY0A is set and delivered from the fourth calculation circuit 49 to the state indication unit 32, as shown in FIG. 6, because two of the vector load instructions VLD1 and VLD2 are issued to the memory unit 13.

Therefore, the memory unit 13 consecutively processes the first and the second vector load instructions VLD1 and VLD2 to load the zeroth vector register 20 with the vector data signals, respectively.

The zeroth vector register 20 begins to be loaded with the first vector data signals in accordance with the first vector load instruction VLD1 at a second time instant t2. At a third additional time instant t3' preceding the second time instant t2, the load wait flag LDW0 is reset. The third additional time instant t3' is determined in consideration of delays necessary for transfer.

When the load wait flag LDW0 is reset at the third additional time instant t3', the first parameter signal PA1 is sent from the second calculation circuit 47 through the second flip flop circuit 52 to the instruction processing unit 12. In this event, the read wait flag RW0 is reset while the read busy flag RBSY0 is set. The load wait flag LDW0 is set to inhibit the zeroth vector register 20 from being accessed by the following instruction with the load busy flag LDBSY0 kept at a set state and with the auxiliary load busy flag LDBSY0A reset.

When the read wait flag RW0 is reset as a result of production of the first parameter signal PA1, the second multiplication instruction VMY2 is sent from the instruction register 31 to the instruction stack register 36. Consequently, the read wait flag RW0 is set again.

At a fourth time instant t4, the first vector data signals are completely read out of the zeroth vector regiser 20. Therefore, the zeroth vector register 20 becomes accessible again after the fourth time instant t4. Taking the above into consideration, the load wait flag LDW0 and the read busy flag RBSY0 are reset in advance at a fourth additional time instant t4' before the fourth time instant t4. Under the circumstances, the second multiplication instruction VMY2 is sent through the second decoder 43 to the second calulation circuit 47 of the monitoring circuit 42. As a result, the first parameter signal PA1 for the second multiplication instruction VMY2 is delivered to the instruction processing unit 12 at a time instant between the fourth additional time instant t4' and the fourth time instant t4.

When the first parameter signal PA1 for the second multiplication instruction VMY2 is produced by the monitoring circuit 42, the read wait flag RW0 is reset while the read busy flag RBSY0 is set. Thereafter, the zeroth vector register 20 is successively loaded with the second vector data signals in accordance with the second load instruction VLD2. Simultaneously, the second vector data signals are successively read out of the zeroth vector register 20 and subjected to multiplication to be written into the third vector register VMY2 in accordance with the second multiplication instruction 23. During the above-mentioned operation, the read busy flag RBSY0 is reset before the first vector data signals are completely read out of the zeroth vector register 20 while the load busy flag LDBSY0 is reset before a fifth time instant t5 at which results of multiplication are fully stored or written into the third vector register 23.

Thus, the first step S1 for the first load instruction VLD1 begins at the first time instant t1 and finishes when the vector data signals are completely moved to the zeroth vector register 20. The second step S2 is started at the first additional time instant t1' and ended when the products are written into the second vector register 22 in compliance with the first multiplication instruction VMY1. It is noted that the third step S3 for the second vector load instruction VLD2 is started at the second additional time instant t2' at which the vector data signals are moved to the zeroth vector register 20 in accordance with the first load instruction VLD1. Thus, loading operation for the zeroth vector register 20 is successively carried out without substantial interruptions and products for the VMY1 and VMY2 can be substantially continuously calculated, as shown in FIG. 6. This means that resources, such as the vector multiplier 24 and vector adder 25, which are operable at a high speed are effectively utilized in the illustrated device. Consequently, it is possible to remarkably improve performance for vector processing even when vector load instructions are included in a sequence of instructions.

While this invention has thus far been described in conjunction with a preferred embodiment thereof, it will readily be understood for those skilled in the art to put this invention into practice in various other manners. For example, the information processing device may be applicable to usual arithmetic calculation except the vector processing. Similar operations can be carried out when store instructions for storing data signals in the memory unit 13 are given to the instruction decoder 11. More than two load or store instructions may be simultaneously sent to the memory unit 13. The number of the vector registers is not restricted to four. Any other flags may be used to carry out calculation as mentioned above. Any other devices may be substituted for the memory unit 13 and may therefore be called cooperating means for cooperating with the instruction processing unit 12 in response to the second parameter signal PA2 or alternately, utilizing means for utilizing a result of processing of the instruction processing unit 12.

What is claimed is:

1. In an information processing device operable in response to a sequence of instructions and comprising:
an instruction interpreting unit for interpreting said instructions to produce a first and a second indication signal when said instructions being to a first and a second groups, respectively;

an instruction processing unit coupled to said instruction interpreting unit for processing the instructions of said first group in response to said first indication signal to produce a result of processing;

utilizing means coupled to said instruction interpreting unit and said instruction processing unit for utilizing the results of said instruction processing unit in compliance with the instructions of said second group in response to said second indication signal; and wherein said instruction interpreting unit includes:

state indicating means for producing a plurality of state indicating signals, said state indicating signals being indicative of internal states of said instruction process unit;

stack register means responsive to an enable signal for temporarily storing the instructions of said first group to produce retained, first-group instructions which are delayed in time relative to aid second group of instructions; and local processing means responsive to the instructions of said first and said second groups and coupled to said stack register means, said state indicating means, said instruction processing unit, and said utilizing means, said local processing means processing the instructions of said first and said second groups with reference to said state indicating signals and said retained, first-group instructions to deliver said first and second indication signals to said instruction processing unit and said utilizing means, respectively, and to deliver said enable signal to said stack register means when the instruction being processed belongs to said first group.

2. An information processing device as claimed in claim 1, wherein said local processing means comprises:

first decoder means for decoding the instructions of said first and said second groups to selectively produce a first and a second decoded signal indicative of reception of said first and second groups, respectively;

first delivery means operatively coupled to said first decoder means and said stack register means for delivering said enable signal to said stack register means to make said stack register means store the instructions of said first group with reference to said state indicating signals in response to said first decode signal;

second delivery means operatively coupled to said stack register means, said state indicating means, and said first decoder means, for delivering said first indication signal to said instruction processing unit with reference to said retained first-group instructions and said state indicating signals when said first decoded signal is produced from said first decoder means; and third delivery means operatively coupled to said first decoder means, said state indicating means, and said stack register means for delivering said second indication signal to said utilizing means with reference to said retained first-group instructions and said state indicating signals when said second decoded signal is produced from said first decoder means.

3. An information processing device as claimed in claim 2, wherein said local processing means further comprises:

fourth delivery means coupled to said first decoder means, said stack register means, said state indicating means, and said first through third delivery means for delivering flag signals to said state indicating means to modify said state indicating signals by said flag signals.

* * * * *